(12) United States Patent
Delaille et al.

(10) Patent No.: US 8,536,836 B2
(45) Date of Patent: Sep. 17, 2013

(54) METHOD FOR DETERMINING THE END-OF-DISCHARGE THRESHOLD OF A RECHARGEABLE BATTERY

(75) Inventors: Arnaud Delaille, Bassens (FR); Marion Perrin, Mery (FR)

(73) Assignee: Commissariat a l'Energie Atomique, Paris (FR)

( * ) Notice: Subject to any disclaimer, the term of this patent is extended or adjusted under 35 U.S.C. 154(b) by 570 days.

(21) Appl. No.: 12/312,945

(22) PCT Filed: Dec. 4, 2007

(86) PCT No.: PCT/FR2007/001989
§ 371 (c)(1),
(2), (4) Date: Jun. 1, 2009

(87) PCT Pub. No.: WO2008/081106
PCT Pub. Date: Jul. 10, 2008

(65) Prior Publication Data
US 2010/0060236 A1    Mar. 11, 2010

(30) Foreign Application Priority Data
Dec. 22, 2006  (FR) .................................. 06 11277

(51) Int. Cl.
*H02J 7/00*  (2006.01)
(52) U.S. Cl.
USPC ............................................... 320/135
(58) Field of Classification Search
None
See application file for complete search history.

(56) References Cited

U.S. PATENT DOCUMENTS

| | | | |
|---|---|---|---|
| 6,023,151 A | 2/2000 | Hudson et al. | |
| 6,137,292 A * | 10/2000 | Hirsch et al. | 320/132 |
| 6,181,103 B1 | 1/2001 | Chen | |
| 6,204,634 B1 | 3/2001 | Zimmerman et al. | |
| 6,211,654 B1 * | 4/2001 | O'Sullivan | 320/149 |
| 6,255,801 B1 | 7/2001 | Chalasani | |

FOREIGN PATENT DOCUMENTS
FR   2 811 486 A1   1/2002

OTHER PUBLICATIONS

Pascoe et al., "Estimation of VRLA Battery Capacity Using the Analysis of The Coup De Fouet Region," Intelec. '99 21$^{st}$ International Telecommunications Energy Conference, Copenhagen, Denmark, Jun. 6-9, 1999, Intelec. International Telecommunications Energy Conference, New York, NY, Jun. 6, 2009, IEEE, pp. 6-1 (1-9).
Anbuky et al., "Knowledge Based VRLA Battery Monitoring and Health Assessment," Intelec., 22nd International Telecommunication Energy Conference, 2000, , Sep. 10-14, 2000, Piscataway, NJ, IEEE, pp. 687-694.

* cited by examiner

Primary Examiner — Edward Tso
Assistant Examiner — Robert Grant
(74) Attorney, Agent, or Firm — Oliff & Berridge, PLC (57) ABSTRACT

The method for determining the end-of-discharge voltage threshold of a rechargeable battery includes discharging the battery up to a predefined end-of-discharge voltage threshold, at least partially charging the battery, determining, while at least partially charging the battery, an electrical parameter representative of a coup de fouet effect, which coup de fouet effect appears during the partial charging, comparing said electrical parameter with a predetermined characteristic and updating the end-of-discharge voltage threshold to be used for subsequent discharging according to the result of said comparison.

13 Claims, 5 Drawing Sheets

METHOD FOR DETERMINING THE END-OF-DISCHARGE THRESHOLD OF A RECHARGEABLE BATTERY

BACKGROUND OF THE INVENTION

The invention relates to a method for determining the end-of-discharge threshold of a rechargeable battery.

STATE OF THE ART

Electrochemical storage batteries, or rechargeable batteries, are used in numerous mobile applications of the type involving portable electronics, thermal, electric or hybrid vehicles etc., or numerous stationary applications of the type involving telecommunication relays or production of electricity from intermittent energy sources, such as wind or photovoltaic power etc, in all cases an element of prime importance as well as fragile.

To optimize their lifetime in the scope of these different applications, rechargeable batteries generally have to be protected against any in-depth discharge, which would most of the time be synonymous with premature degradation, or even in certain cases with the impossibility of being recharged. In all applications in which rechargeable batteries are liable to reach in-depth discharge states, Low Voltage Disconnect (LVD) thresholds are therefore used to stop discharging.

Once this voltage threshold has been reached, the battery is disconnected. The end-of-discharge threshold values for different discharge rates are initially determined, when a new type of batteries is developed, by very empirical, numerous, lengthy and therefore costly measurements. In addition, optimal adjustment of these voltage thresholds is a very delicate matter. Although these voltage thresholds take account of the battery technology or of the dimensioning of the system, they are nevertheless kept constant throughout operation of the battery. However the voltage of a battery depends both on its technology, but also on its operating conditions, i.e. the charging or discharging current, relaxation period, temperature, and finally its state of health, or its state of wear.

In the case of a battery able to comprise a series connection of cells, a non-homogeneity between the cells can itself have an incidence on the voltage measured at the terminals of the whole battery. In other words, there is no direct relation, or at least only an approximate relation, between the voltage of a battery and its state of charge. The voltage criteria used at the present time are therefore not capable of fully appreciating the depth of discharge of rechargeable batteries integrating all of the contributions described above. Depending on the operating conditions or ageing conditions of the battery or of the cells, these voltage thresholds therefore tend not to be ideal, and may even in certain cases lead to premature degradation of the battery.

Finally, it should be noted that to protect against damage of this kind, the end-of-discharge thresholds used to stop discharging are very greatly over-evaluated in present regulators to ensure that the battery never drops below the really critical state-of-charge threshold. To take the example of lead-acid batteries used in photovoltaic systems, the end-of-discharge threshold is generally about 1.9V/cell (i.e. 11.4V for a 6-cell battery), whatever the conditions of wear or operation of the batteries. However, lead-acid batteries could most of the time be used down to a threshold close to 1.8V/cell (i.e. 10.8V for a 6-cell battery), without any detrimental consequence for their use. This results in a lack of storage energy which can attain nearly 10% of the battery capacity. Management of end of discharge of a rechargeable battery is therefore not optimal.

OBJECT OF THE INVENTION

The object of the invention consists in providing a method for determining the end-of-discharge threshold of a rechargeable battery that is efficient, simple to achieve, and that enables management of end of discharge of the battery to be improved.

This object is achieved by the method according to the appended claims.

BRIEF DESCRIPTION OF THE DRAWINGS

Other advantages and features will become more clearly apparent from the following description of specific embodiments of the invention given for non-restrictive example purposes only and represented in the accompanying drawings, in which.

DESCRIPTION OF A PREFERRED EMBODIMENT OF THE INVENTION

In the description that follows, the term battery encompasses both batteries and electrochemical cells. The voltage levels given for illustration purposes will be given for a lead battery and correspond to the values per battery cell.

In conventional manner, an energy source supplies power to a load via for example a battery. The battery discharging and charging cycles are controlled by a control device connected to the terminals of the battery and measuring for example the voltage at the battery terminals. Generally, the control device controls discharging of the battery by actuating a first switch designed in particular to disconnect the battery after discharging. The control device controls charging of the battery, by means of the energy source, by actuating a second switch. Control of discharging of the rechargeable battery, integrating in particular the method for determining the end-of-discharge threshold according to the invention and which will be described in the following, can thus be implemented in the control device by any suitable means, and more particularly by means of a microprocessor in which the different steps of the method for determining the end-of-discharge threshold are programmed.

Figure 1:
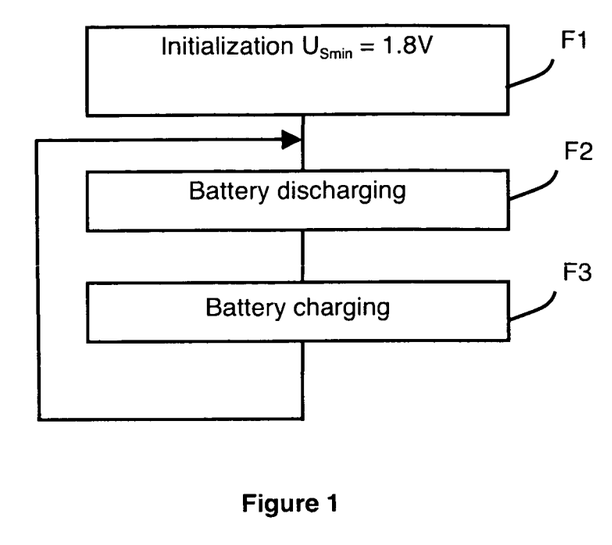
FIG. 1 illustrates a rechargeable battery management method, in flowchart form.

FIG. 1 illustrates a known method for management of a rechargeable battery in flowchart form. In conventional manner, in a step F1, the control device initializes the value of the end-of-discharge threshold to determine the initial end-of-discharge threshold $U_{Smin}$ which will be used as end-of-discharge criterion in the subsequent steps of the method, in particular in the next step (F2) of the method, i.e. the battery discharge step. The value 1.8V is for example assigned to $U_{Smin}$. Step F1 corresponds to the first step of the management method, which step precedes a succession of charging and discharging cycles as described below.

The value assigned to $U_{Smin}$ corresponds either to a value predefined in the course of experiments made during development of this type of battery prior to marketing thereof or to a value determined by the methods represented by the flowcharts of FIGS. 4 and 5, which will be described further on.

Assuming that the battery is charged at the beginning of the management method, in known manner the control device then goes on to step F2 of the flowchart of FIG. 1 in which discharging of the battery is controlled as described above. Step F2 will be maintained so long as the voltage U measured continuously at the battery terminals during discharging of the latter remains greater than $U_{Smin}$, i.e. more than 1.8V. When the voltage U becomes less than or equal to 1.8V, the control device goes on to battery charging step F3 during which step the control device controls charging of the battery, as described above, up to a full-charge level. When full-charge state of the battery is reached, the control device automatically goes back to step F2. In the rest of the method, steps F2 and F3 are chained alternately one after the other under control of the control device.

In an alternative embodiment of the battery management method, a step (not shown) can be inserted between steps F2 and F3 to perform disconnection of the battery, in particular when it is beneficial for the battery to have a rest time.

The control device can of course go regardless directly to step F3 on output from step F1 if it observes or has knowledge that the battery is empty or partially empty at the beginning of the method, before going on to step F2. Alternate chaining of steps F2 and F3 is subsequently controlled by the control device.

Figure 2:
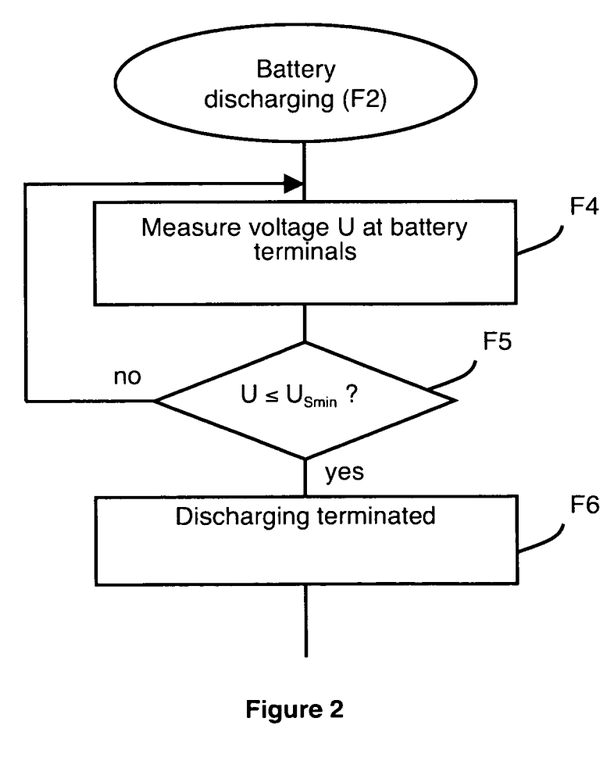
FIG. 2 illustrates the discharging step appearing in the flowchart of FIG. 1, in flowchart form.

FIG. 2 illustrates, in flowchart form, that during the discharging step F2 appearing in the flowchart of FIG. 1, the control device performs measurement of the voltage U at the battery terminals in a step F4. In a step F5, the control device compares the voltage U with the value $U_{Smin}$ initialized during step F1. If voltage U is greater than $U_{Smin}$ (no output of step F5), the control device goes back to step F4 and the battery continues to discharge. If, on the other hand, voltage U is less than or equal to $U_{Smin}$ (yes output of step F5), the control device goes on to a step F6 in which it stores the fact that discharging of the battery is terminated. Going from step F4 to step F5 takes place automatically at a preset frequency.

Figure 3:
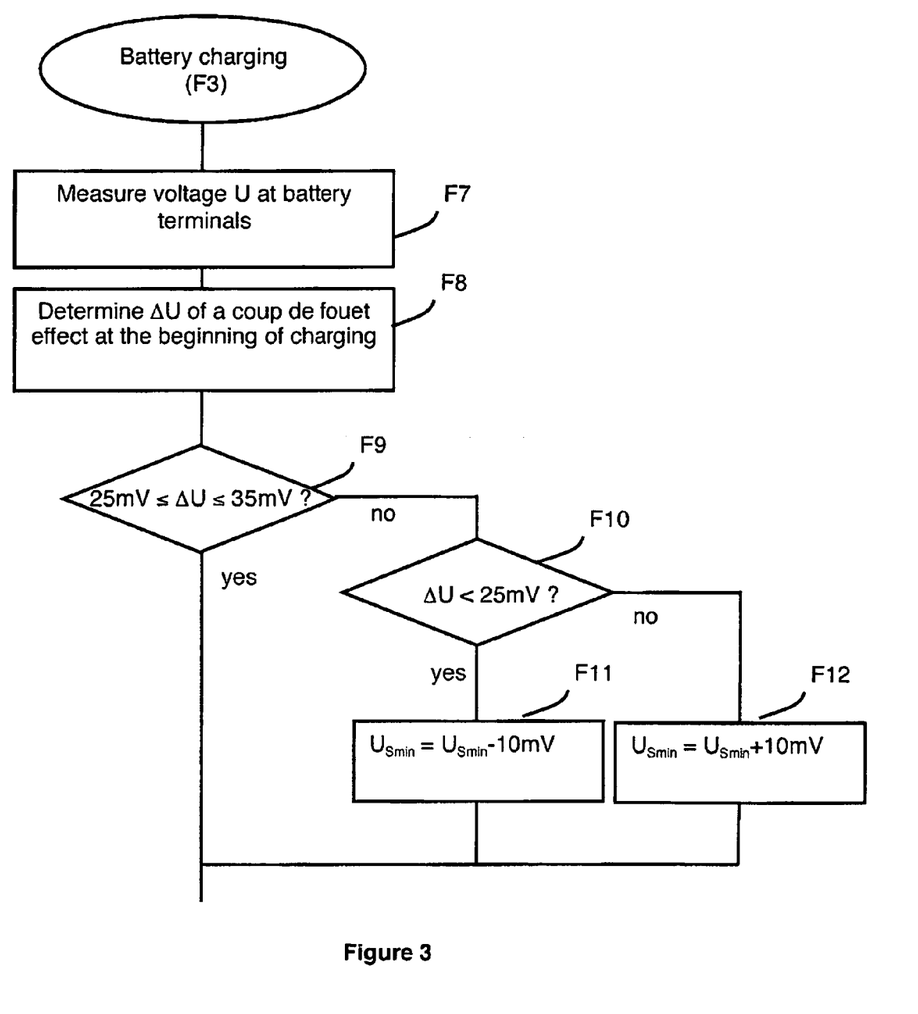
FIG. 3 illustrates the charging step appearing in the flowchart of FIG. 1, in flowchart form, which step incorporates steps of a specific embodiment of a determining method according to the invention.

FIG. 3 illustrates, in flowchart form, that during the charging step F3 appearing in the flowchart of FIG. 1, the control device performs measurement of voltage U at the battery terminals in a first step F7. After a sufficient time period to enable a coup de fouet effect to occur (about a few minutes), the control device determines at least one electrical parameter representative of the coup de fouet effect, in a step F8.

Figure 6:
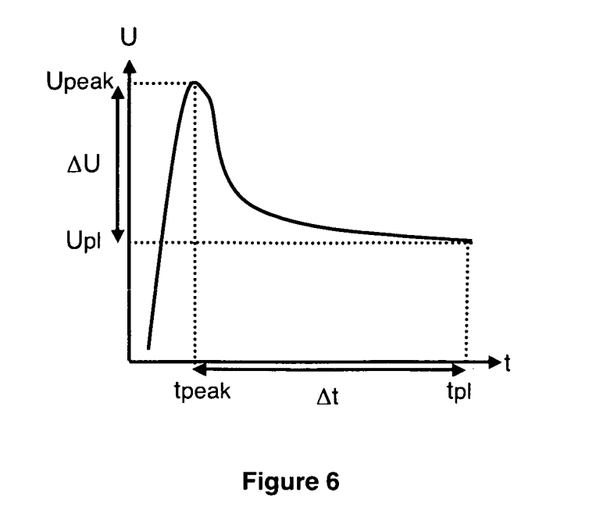
FIG. 6 represents the variations of the voltage U at the terminals of a fully discharged battery at the beginning of a charging period, versus time.
Figure 7:
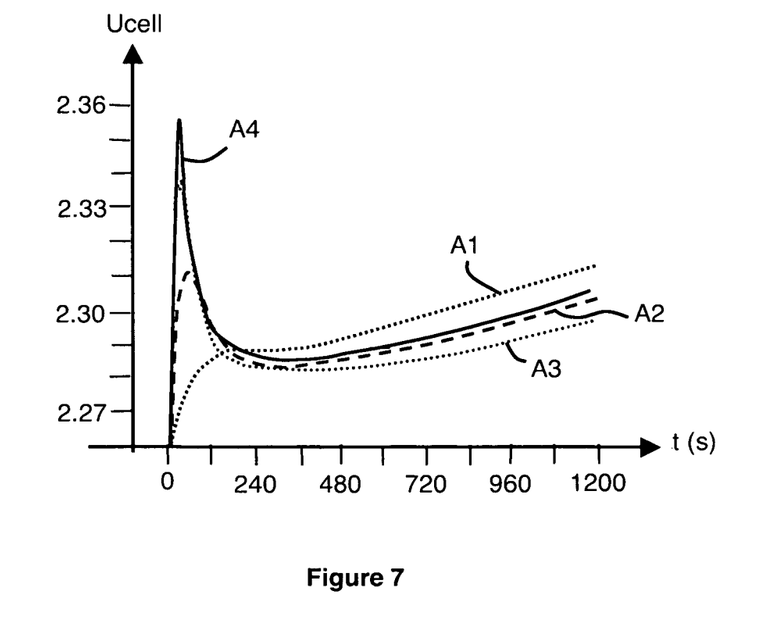
FIG. 7 represents the variations of the electrical parameters of a coup de fouet effect on charging, during partial charging cycles performed under similar conditions at $0.1\ C_{10}$, following dischargings interrupted respectively at end-of-discharge thresholds of 1.95V (plot A1), 1.90V (plot A2), 1.80V (plot A3), and 1.70V (plot A4).

As illustrated in FIG. 6 which represents the variations of voltage U at the terminals of a fully discharged battery being partially charged versus time t, a coup de fouet effect on charging can be observed at the beginning of charging of a previously sufficiently discharged battery. The coup de fouet on charging is characterized by a voltage peak at the terminals of the battery in a first charging phase of a sufficiently discharged battery, before the voltage drops back down to a plateau during the next phase. The coup de fouet can be characterized by different parameters such as for example the peak voltage Upeak, plateau voltage Upl, the difference $\Delta U = Upeak - Upl$ between the peak voltage and the plateau voltage, the peak time tpeak necessary to reach peak voltage Upeak from the beginning of charging, the plateau time tpl necessary to reach plateau voltage Upl, and/or the difference $\Delta t = tpl - tpeak$ between the plateau time and peak time FIG. 7 represents the variations of the electrical parameters of a coup de fouet effect on charging for a lead-acid battery cell when partial charging is performed under similar conditions following discharges interrupted respectively at voltage thresholds of 1.95V (plot A1), 1.90V (plot A2), 1.80V (plot A3), and 1.70V (plot A4). These curve plots illustrate the connection existing between the parameters representative of a coup de fouet effect on charging and the previous discharging conditions, more particularly with respect to the end-of-discharge threshold, in other words the depth of discharge reached. In particular, the lower the end-of-discharge threshold, i.e. the greater the depth of discharge, the greater the amplitude of the coup de fouet effect on charging (Upeak and/or $\Delta U$).

In step F8 (FIG. 3), the control device determines an electrical parameter representative of one of the parameters representative of the coup de fouet effect which occurred while voltage U was measured at the beginning of charging, i.e. during step F7, for example an electrical parameter representative of the difference $\Delta U$ of the coup de fouet effect which occurred during step F7. For the sake of simplification, the electrical parameter representative of the coup de fouet effect parameter $\Delta U$ corresponds to the value of $\Delta U$.

Then, in a step F9, the control device makes a comparison between the calculated value of $\Delta U$ and a predefined range of values for example comprised between 25 mV and 35 mV. These values correspond to a current regime called $I_{10}$, i.e. a current regime to obtain a battery discharge in 10 hours. A person skilled in the art will be able to adjust these values for other current regimes. If $\Delta U$ is outside this range of values (no output of F9), the control device goes on to a step F10 in which $\Delta U$ is compared with the lower limit of the predefined range of values, i.e. with 25 mV. If $\Delta U$ is greater than 25 mV (no output of F10), $\Delta U$ is therefore greater than 35 mV (since, according to F9, $\Delta U$ is not in the range comprised between 25 mV and 35 mV). The control device then goes on to a step F12 in which the end-of-discharge threshold $U_{Smin}$ is raised by a predetermined first value, for example equal to 10 mV. On the contrary, if $\Delta U$ is less than 25 mV (yes output of F10), the control device goes on to a step F11 in which the end-of-discharge threshold $U_{Smin}$ is lowered by a predetermined second value, for example equal to 10 mV.

If on the other hand, in step F9, the control device observes that $\Delta U$ is comprised within the range of values comprised between 25 mV and 35 mV, no modification is made to end-of-discharge threshold $U_{Smin}$.

In other words, during step F3 appearing in the flowchart of FIG. 1, the control device performs the following steps:
  charging of the battery,
  determining, during said charging, an electrical parameter $\Delta U$ representative of a coup de fouet effect on charging,
  comparison of said parameter $\Delta U$ with a predetermined characteristic (range of values comprised between 25 mV and 35 mV),
  updating, if necessary, the end-of-discharge threshold $U_{Smin}$ to be used for subsequent discharging, according to the result of said comparison.

Updating of the end-of-discharge threshold $U_{Smin}$ consists in:

raising the end-of-discharge threshold $U_{Smin}$ by a predetermined first value (10 mV) when the parameter $\Delta U$ is greater than said range of values, lowering the end-of-discharge threshold $U_{Smin}$ by a predetermined second value (10 mV) when the parameter $\Delta U$ is lower than said range of values.

These successive steps are performed following each discharging (step F2) of the battery up to the end-of-discharge threshold $U_{Smin}$. Consequently, the end-of-discharge threshold $U_{Smin}$ used during each discharging step F2 of the management method of the flowchart of FIG. 1 is updated if necessary (steps F11 and F12) during the next charging step F3 in order to modify, if necessary, the end-of-discharge threshold $U_{Smin}$ which will be used during the discharging step F2 of the next cycle. The battery management method (chaining of cycles comprising charging F3 and discharging F2) therefore incorporates a method for determining the end-of-discharge threshold $U_{Smin}$ which is performed at each cycle. This determining method is applied, performing updating if necessary, in the course of the first cycle of the initial end-of-discharge threshold $U_{Smin}$ initialized during step F1 and, in the course of the following cycles, of the end-of-discharge threshold $U_{Smin}$ used in the previous cycle.

In step F8, as an alternative embodiment, the control device can determine an electrical parameter representative of another parameter of the coup de fouet effect, for example the peak voltage Upeak. Steps F9 to F12 have to be modified accordingly, in particular as far as the values of the limits of the range of values used in steps F9 and F10 are concerned, for example on the basis of FIG. 7. The Upeak parameter however remains less interesting than $\Delta U$ as it depends on ageing of the battery.

This method for determining the end-of-discharge threshold $U_{Smin}$ begins at the end of discharging of each charging/discharging cycle, so as to know the end-of-discharge threshold $U_{Smin}$ to be used when discharging is performed in the following cycle. It presents in particular the advantage of adjusting the end-of-discharge threshold $U_{Smin}$ throughout the lifetime of the battery taking the impact of the conditions of the previous cycles into account. It is thus possible to take the whole of the electrical history of the battery into consideration to optimize the end-of-discharge threshold $U_{Smin}$ to be applied at each cycle, thereby optimizing the reliability, lifetime and performances of the battery. Furthermore, determination of the end-of-discharge threshold $U_{Smin}$ to be applied at each cycle is performed directly at the beginning of this cycle by a simple analysis of the voltage response at the battery terminals (i.e. analysis of the coup de fouet effect at the beginning of charging), an analysis made during and by means of the charging of this cycle and therefore not requiring any superfluous steps.

Nevertheless, analysis of the electrical parameters representative of the coup de fouet effect on charging measured when at least partial charging of the battery is performed can be used to choose the charging strategy to be used in a subsequent charging step of the battery. Generally speaking, all types of charging strategy can be used. Standard charging strategies conventionally comprise successive phases during which charging is current-controlled or voltage-controlled. These phases are generally interrupted on stop criteria according to voltage thresholds or quantities of charge. A new charging strategy, based on the extent of discharge (itself a function of the end-of-discharge threshold $U_{Smin}$), determined on the basis of the electrical parameters representative of the coup de fouet effect on charging observed at the beginning of charging of the battery, can for example consist in adding an overcharging phase after a standard charging procedure, in applying a boost charge or a pulsed current.

In known techniques, determining the initial end-of-discharge threshold $U_{Smin}$ (to be used for example in step F1 of the flowchart of FIG. 1) of a new type of battery represents a lengthy and costly step of development of this new type of battery. The initial end-of-discharge threshold $U_{Smin}$ does in fact have to be determined for all the discharging conditions that can be envisaged. FIGS. 4 and 5 illustrate two methods for determining the initial end-of-discharge threshold $U_{Smin}$ of a new type of battery, in flowchart form, enabling the above problems to be addressed. The method of FIG. 4 uses the same general determination principle as that of FIG. 3. The method of FIG. 5 for its part constitutes an alternative embodiment enabling the end-of-discharge threshold to be determined by computing the mean of two end-of-discharge thresholds updated using the basic principle of the invention.

Figure 4:
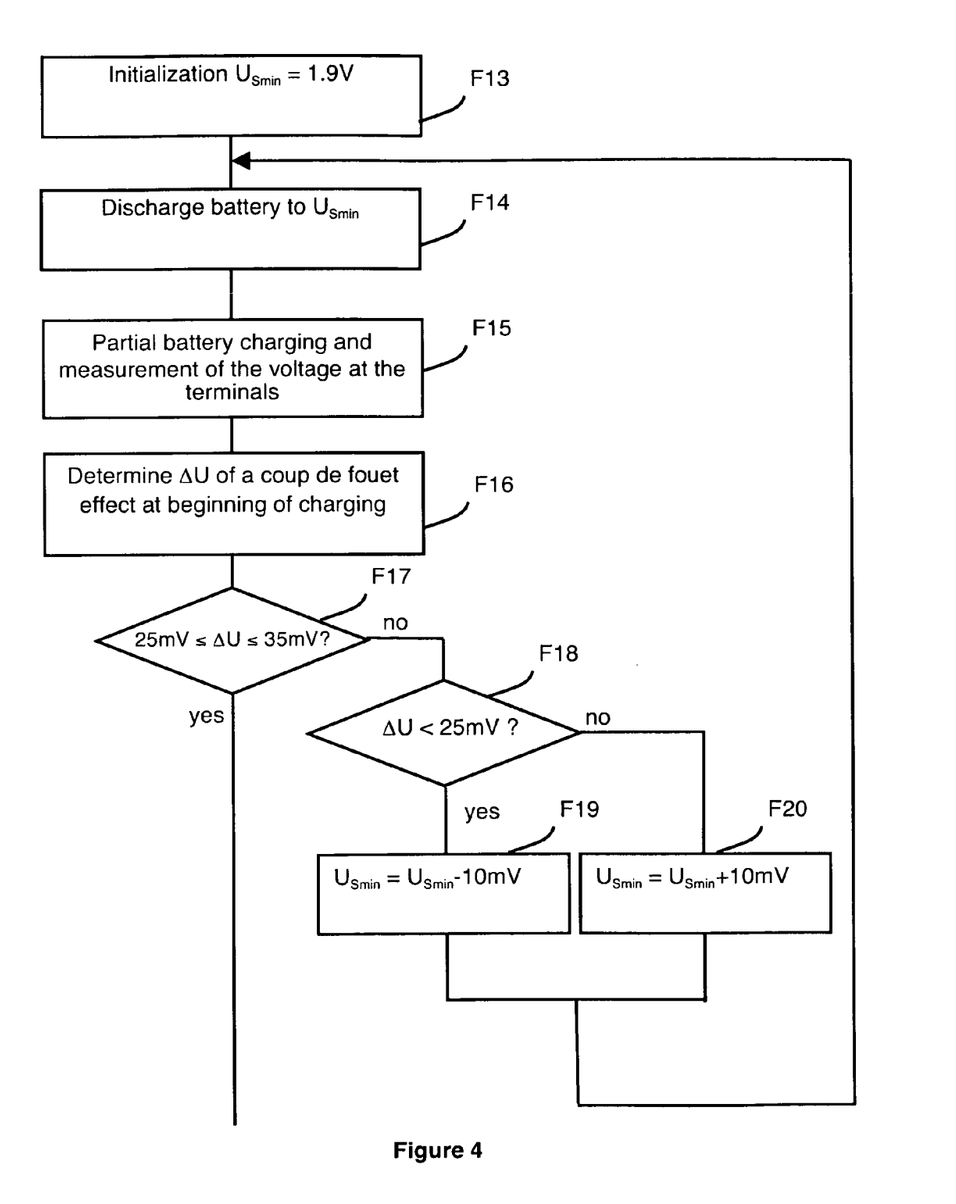
FIGS. 4 and 5 illustrate two alternative embodiments of a method for determining the initial end-of-discharge threshold of a new type of battery, in flowchart form.

The method of FIG. 4 applies to a previously charged battery. In a step F13, the control device initializes the end-of-discharge threshold $U_{Smin}$ to an arbitrary value, for example equal to 1.9V. In a step F14, the control device performs discharging of the battery until the voltage U at its terminals reaches 1.9V. This step F14 is identical to step F2 of the management method of FIG. 1 and is carried out according to steps F4 to F6 of FIG. 2. Then, in a step F15, the control device performs partial charging of the battery and measures the voltage U at the battery terminals. This partial charging is performed for a sufficient period of time to enable a coup de fouet effect to occur (about a few minutes). The control device then determines at least one electrical parameter representative of the coup de fouet effect in a step F16. More precisely, the control device determines an electrical parameter representative of one of the parameters representative of the coup de fouet effect that occurred while the voltage U was measured during partial charging, for example an electrical parameter representative of the difference $\Delta U$ of the coup de fouet effect which occurred during step F15. For the sake of simplification, the electrical parameter representative of the coup de fouet effect parameter $\Delta U$ corresponds to the value of $\Delta U$.

The control device then makes a comparison, in a step F17, between the computed value of $\Delta U$ and a predetermined range of values for example comprised between 25 mV and 35 mV. If $\Delta U$ is outside this range of values (no output of F17), the control device goes on to a step F18 in which $\Delta U$ is compared with the lower limit of the predetermined range of values, i.e. with 25 mV. If $\Delta U$ is greater than 25 mV (no output of F18), $\Delta U$ is therefore greater than 35 mV (since according to F17, $\Delta U$ is not within the range comprised between 25 mV and 35 mV). The control device goes on to a step F20 in which the end-of-discharge threshold $U_{Smin}$ is raised by a first predetermined value, for example equal to 10 mV. If on the other hand $\Delta U$ is less than 25 mV (yes output of F18), the control device goes on to a step F19 in which the end-of-discharge threshold $U_{Smin}$ is lowered by a second predetermined value, for example equal to 10 mV. On output from steps F19 and F20, the control device loops back to step F14 and reproduces the following steps F15 to F17.

If on the other hand, in step F17, the control device observes that $\Delta U$ is comprised within the range of values comprised between 25 mV and 35 mV, no updating is made to the end-of-discharge threshold $U_{Smin}$. The method of FIG. 4 is then terminated and the initial end-of-discharge threshold $U_{Smin}$ of a new type of battery is determined.

This method for determining the initial end-of-discharge threshold of a new type of battery is terminated when the control device quits step F17 via the yes output. The successive steps F14 to F17 are therefore performed once only if the end-of-discharge threshold $U_{Smin}$ initialized in step F13 enables a difference $\Delta U$ comprised between 25 mV and 35 mV to be obtained directly. If this is not the case, the control device quits step F17 via the no output to perform step F18 and then step F19 or F20. Steps F18 to F20 perform updating of the end-of-discharge threshold. After updating has been performed, the control device performs steps F14 to F17 again. This looping sequence is performed until the end-of-discharge threshold $U_{Smin}$ enables a difference $\Delta U$ comprised between 25 mV and 35 mV to be obtained in step F16.

In other words, during the method of FIG. 4, the control device performs the following steps:
  discharging F14 of the battery up to the threshold initialized in step F13,
  partial charging F15 of the battery,
  determining F16, during said charging, an electrical parameter $\Delta U$ representative of a coup de fouet effect on charging,
  comparison F17 of said parameter $\Delta U$ with a predetermined characteristic (range of values comprised between 25 mV and 35 mV),
  updating F18, F19, F20 the end-of-discharge threshold $U_{Smin}$ if necessary, according to the result of said comparison.

Updating, if necessary, of the end-of-discharge threshold $U_{Smin}$ consists in:
  raising F20 the end-of-discharge threshold $U_{Smin}$ by a predetermined first value (10 mV) when the parameter $\Delta U$ is greater than said range of values,
  lowering F19 the end-of-discharge threshold $U_{Smin}$ by a predetermined second value (10 mV) when the parameter $\Delta U$ is lower than said range of values.

In step F16, the control device can determine an electrical parameter representative of another parameter of the coup de fouet effect, for example of peak voltage Upeak. Steps F17 to F20 have to be modified accordingly, in particular as far as the values of the limits of the range of values used in steps F17 and F18 are concerned.

Figure 5:
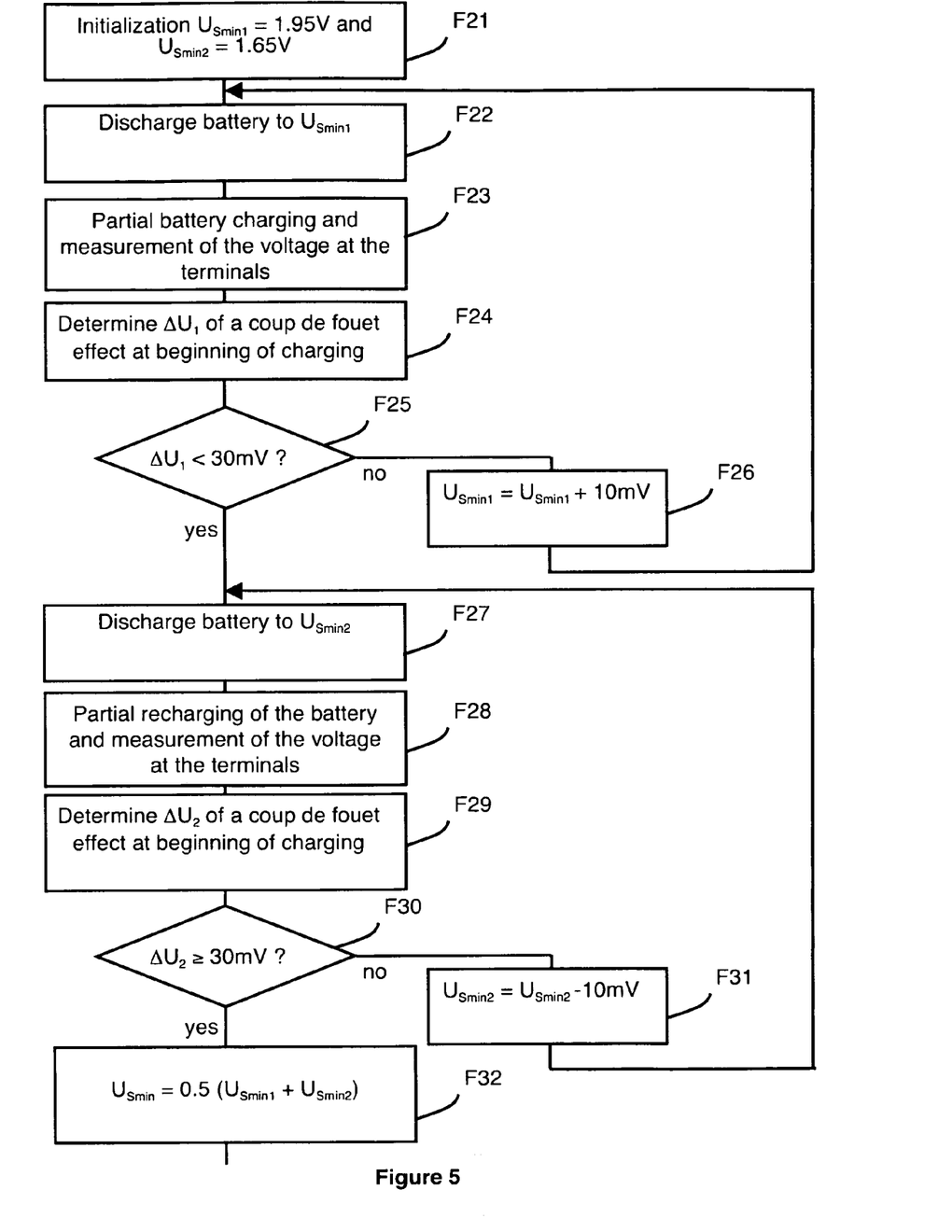

The method of FIG. 5 for determining the initial end-of-discharge threshold $U_{Smin}$ of a new type of battery is a variant performed by computing the mean of two end-of-discharge thresholds $U_{Smin1}$ and $U_{Smin2}$ updated if necessary using the basic principle of the invention. The method of FIG. 5 applies to a battery that has been previously charged. In a step F21, the control device initializes a first end-of-discharge threshold $U_{Smin1}$ and a second end-of-discharge threshold $U_{Smin2}$ to arbitrary values, for example respectively equal to 1.95V and 1.65V. In a step F22, the control device performs discharging of the battery until the voltage U at its terminals reaches $U_{Smin1}$, i.e. 1.95V. This step F22 is identical to step F2 of the management method of FIG. 1 and takes place according to steps F4 to F6 of FIG. 2. Then, in a step F23, the control device performs partial charging of the battery and measures the voltage U at the terminals of the battery. This partial charging is performed for a sufficient period of time to allow a coup de fouet effect on charging to occur (about a few minutes). The control device then determines at least one electrical parameter representative of the coup de fouet effect in a step F24. More precisely, the control device determines an electrical parameter representative of one of the parameters representative of the coup de fouet effect that occurred while the voltage U was measured during partial charging, for example an electrical parameter representative of the difference $\Delta U_1$ of the coup de fouet effect that occurred in step F23. For the sake of simplification, the electrical parameter representative of the coup de fouet effect parameter $\Delta U_1$ corresponds to the value of $\Delta U_1$.

Then, in a step F25, the control device makes a comparison between the computed value of $\Delta U_1$ and a single predetermined threshold value, for example 30 mV. If $\Delta U_1$ is greater than or equal to this threshold value (no output of F25), the control device goes on to a step F26 in which the end-of-discharge threshold $U_{Smin1}$ is raised by a third predetermined value, for example equal to 10 mV. On output from step F26, the control device loops back to step F22 and reproduces the following steps F23 to F25.

If on the other hand, in step F25, the control device observes that $\Delta U$ is less than 30 mV (yes output of F25), no updating is made to the first end-of-discharge threshold $U_{Smin1}$.

The first part of the method for determining the initial end-of-discharge threshold of a new type of battery is terminated when the control device quits step F25 via the yes output. The successive steps F22 to F25 are therefore performed once only if the end-of-discharge threshold $U_{Smin1}$ initialized in step F21 enables a difference $\Delta U_1$ of less than 30 mV to be obtained directly. If this is not the case, the control device quits step F25 via the no output to carry out step F26 which performs updating of the end-of-discharge threshold $U_{Smin1}$. Following updating, the control device performs steps F22 to F25 again. This looping sequence is performed so long as the first end-of-discharge threshold $U_{Smin1}$ does not enable a difference $\Delta U_1$ of less than 30 mV to be obtained in step F24.

When the first part of the method of FIG. 5 is terminated, the control device performs discharging of the battery, in a step F27, until voltage U at the battery terminals reaches $U_{Smin2}$, i.e. 1.65V. This step F27 is identical to step F2 of the management method of FIG. 1 and takes place according to steps F4 to F6 of FIG. 2. Then, in a step F28, the control device performs partial charging of the battery and measures the voltage U at the battery terminals. This partial charging is performed for a sufficient period of time to enable a coup de fouet effect on charging to occur (about a few minutes). Then, in a step F29, the control device determines an electrical parameter representative for example of the coup de fouet effect parameter $\Delta U_2$, which electrical parameter corresponds for example to the value of $\Delta U_2$.

Then, in a step F30, the control device makes a comparison between the computed value of $\Delta U_2$ and the single threshold value equal to 30 mV. If $\Delta U_2$ is lower than this threshold value (no output of F30), the control device goes on to a step F31 in which the end-of-discharge threshold $U_{Smin2}$ is lowered by a fourth predetermined value, for example equal to 10 mV. On output of step F31, the control device loops back to step F27 and reproduces the following steps F28 to F30.

If on the other hand, in step F30, the control device observes that $\Delta U_2$ is greater than or equal to 30 mV (yes output of F30), no updating is made to the second end-of-discharge threshold $U_{Smin2}$.

The second part of the method for determining the initial end-of-discharge threshold of a new type of battery is terminated when the control device quits step F30 via its yes output. The successive steps F27 to F30 are therefore performed once only if the second end-of-discharge threshold $U_{Smin2}$ initialized in step F21 enables a difference $\Delta U_2$ greater than or equal to 30 mV to be obtained directly. If this is not the case, the control device quits step F30 via its no output and performs step F31 for updating the end-of-discharge threshold $U_{Smin2}$. Following updating, the control device performs steps F27 to F30 again. This looping sequence is repeated until the second end-of-discharge threshold $U_{Smin2}$ enables a difference $\Delta U_2$ greater than or equal to 30 mV to be obtained in step F29.

When the second part of the method of FIG. 5 has been completed, the control device calculates a mean value of the first and second end-of-discharge thresholds $U_{Smin1}$ and $U_{Smin2}$ in a step F32. The method of FIG. 5 is then terminated and the initial end-of-discharge threshold $U_{Smin}$ of a new type of battery is determined and corresponds to the calculated mean value. Step F32 constitutes the third step of the method of FIG. 5.

In other words, the method of FIG. 5 for determining the initial end-of-discharge threshold $U_{Smin}$ of a new type of battery consists in:
  discharging F22 the battery up to a predefined first end-of-discharge threshold $U_{Smin1}$ and updating F26 said first end-of-discharge threshold $U_{Smin1}$ according to the result of the comparison F25 of parameter $\Delta U_1$ representative of the coup de fouet effect with a threshold value (30 mV),
  discharging F27 the battery up to a predefined second end-of-discharge threshold $U_{Smin2}$ that is lower than the predefined first end-of-discharge threshold $U_{Smin1}$ and updating F31 said second end-of-discharge threshold $U_{Smin2}$ according to the result of the comparison F30 of parameter $\Delta U_2$ representative of the coup de fouet effect with said threshold value (30 mV),
  determining the initial end-of-discharge threshold $U_{Smin}$ to be used initially when using a battery of this type, by computing F32 the mean value of the first and second end-of-discharge thresholds $U_{Smin1}$ and $U_{Smin2}$, updated if applicable.

Updating of the first end-of-discharge threshold $U_{Smin1}$ consists in raising F26 said first end-of-discharge threshold $U_{Smin1}$ by a predetermined third value (10 mV) if the parameter $\Delta U_1$ is greater than or equal to the threshold value (30 mV). Updating of the second end-of-discharge threshold $U_{Smin2}$ consists in lowering F31 said second end-of-discharge threshold $U_{Smin2}$ by a predetermined fourth value (10 mV) if the parameter $\Delta U_2$ is lower than the threshold value (30 mV).

Consequently, the methods of FIGS. 1, 4 and 5 each incorporate at least one method for determining the end-of-discharge threshold $U_{Smin}$ comprising the following steps:
  discharging F2, F14, F22, F27 of the battery up to a predefined end-of-discharge threshold $U_{Smin}$, $U_{Smin1}$, $U_{Smin2}$,
  at least partial charging F3, F15, F23, F28 of the battery,
  determining F8, F16, F24, F29, during said charging, an electrical parameter $\Delta U$ representative of a coup de fouet effect on charging,
  comparison F9, F10, F17, F18, F25, F30 of said parameter with a predetermined characteristic,
  updating F11, F12, F19, F20, F26, F31, if necessary, the end-of-discharge threshold $U_{Smin}$ to be used for a subsequent discharging operation, according to the result of said comparison.

The methods for determining described above are applicable to all types of batteries. They are in particular well suited for management of discharging of lead-acid batteries, the use of which is widespread in applications for which energy production is intermittent in order to adapt energy production to the demand, for example in photovoltaic applications.

Generally speaking, all types of charging or discharging can be used provided that a coup de fouet effect on charging is observable, taking account of the type of battery and/or the type of application in which this battery is used. In known manner, the charging and discharging voltage (and possibly the current) at the terminals of the battery is controlled and/or measured during charging and discharging. In the same way, any end-of-charging criteria can be used, based for example on voltage thresholds or on time-based voltage and/or current profiles.

The invention claimed is:

1. A method for determining the end-of-discharge voltage threshold of a rechargeable battery, comprising the following successive steps:
  discharging the battery up to a predefined end-of-discharge voltage threshold,
  charging the battery,
  determining, while charging the battery to less than a full charge state, an electrical parameter representative of a coup de fouet effect, which coup de fouet effect appears during the charging to less than the full charge state,
  comparing the electrical parameter with a predetermined characteristic constituted by a threshold value or a range of values,
  updating the end-of-discharge voltage threshold to be used for subsequent discharging, according to the result of the comparison.

2. The method according to claim 1, wherein the electrical parameter is representative of the difference between the peak voltage and the plateau voltage of the coup de fouet effect that appears during the charging to less than the full charge state.

3. The method according to claim 1, wherein the predetermined characteristic is constituted by a range of values, updating of the end-of-discharge voltage threshold comprising:
  raising the end-of-discharge voltage threshold by a predetermined first value when the parameter is greater than the range of values,
  lowering the end-of-discharge voltage threshold by a predetermined second value when the parameter is lower than the range of values.

4. The method according to claim 3, wherein the range of values is between 25 mV and 35 mV.

5. The method according to claim 3, wherein the predetermined first value is equal to 10 mV.

6. The method according to claim 3, wherein the predetermined second value is equal to 10 mV.

7. The method according to claim 1, wherein, the rechargeable battery being a battery of a new type, the method is used for determining the initial end-of-discharge voltage threshold to be used initially when using a battery of this type, and wherein the predetermined characteristic is constituted by a single threshold value, the method comprising:
  performing the set of successive steps at least once with a predefined first end-of-discharge voltage threshold until the electrical parameter representative of the coup de fouet effect that appears during the charging to less than the full charge state is lower than the single threshold value, in each set of successive steps updating of the first end-of-discharge voltage threshold comprising raising the first end-of-discharge voltage threshold by a predetermined third value if the parameter is greater than or equal to the threshold value,
  performing the set of successive steps at least once with a predefined second end-of-discharge voltage threshold until the electrical parameter representative of a coup de fouet effect that appears during the charging to less than the full charge state is greater than or equal to the single threshold value, in each set of successive steps updating of the second end-of-discharge voltage threshold comprising lowering the second end-of-discharge voltage threshold by a predetermined fourth value if the parameter is lower than the threshold value, determining the initial end-of-discharge voltage threshold by computing the mean value of the first and second end-of-discharge voltage thresholds updated if applicable.

8. The method according to claim 7, wherein the threshold value is 30 mV.

9. The method according to claim 7, wherein the predetermined third value is equal to 10 mV.

10. The method according to claim 7, wherein the predetermined fourth value is equal to 10 mV.

11. The method according to claim 1, wherein the battery is a lead battery.

12. The method according to claim 1, further comprising:
stopping the subsequent discharging of the battery when it reaches the updated end-of-discharge voltage threshold.

13. The method according to claim 1, wherein the charging of the battery is continued up to a fully charged state after determining the electrical parameter representative of a coup de fouet effect.

* * * * *